(12) United States Patent
Shikata et al.

(10) Patent No.: US 8,037,855 B2
(45) Date of Patent: Oct. 18, 2011

(54) VALVE CHARACTERISTIC CONTROLLER AND VALVE CHARACTERISTIC CONTROL SYSTEM

(75) Inventors: Yasuhiro Shikata, Kariya (JP); Minoru Wada, Obu (JP)

(73) Assignee: Denso Corporation, Kariya (JP)

( * ) Notice: Subject to any disclaimer, the term of this patent is extended or adjusted under 35 U.S.C. 154(b) by 536 days.

(21) Appl. No.: 12/169,203

(22) Filed: Jul. 8, 2008

(65) Prior Publication Data

US 2009/0020084 A1  Jan. 22, 2009

(30) Foreign Application Priority Data

Jul. 17, 2007  (JP) .................................. 2007-185198

(51) Int. Cl.
 *F01L 1/34* (2006.01)
(52) U.S. Cl. ................ 123/90.15; 123/90.16; 123/90.17
(58) Field of Classification Search .... 123/90.15–90.17, 123/90.31
See application file for complete search history.

(56) References Cited

U.S. PATENT DOCUMENTS

| | | |
|---|---|---|
| 5,333,577 A | 8/1994 | Shinojima |
| 6,386,158 B1 | 5/2002 | Takahashi et al. |
| 6,659,055 B2 | 12/2003 | Park |
| 6,732,682 B2 * | 5/2004 | Aoyama et al. ............. 123/48 B |
| 6,755,165 B2 | 6/2004 | Kondou et al. |
| 7,004,128 B2 | 2/2006 | Majima et al. |
| 2002/0166527 A1 * | 11/2002 | Takahashi et al. .......... 123/90.15 |
| 2003/0226533 A1 * | 12/2003 | Fujiwara et al. ........... 123/90.17 |

FOREIGN PATENT DOCUMENTS

| | | |
|---|---|---|
| JP | 2001-254639 | 9/2001 |
| JP | 2003-120347 | 4/2003 |
| JP | 2003-254098 | 9/2003 |
| JP | 2003-336529 A | 11/2003 |
| JP | 2004-92534 | 3/2004 |
| JP | 2004-92593 | 3/2004 |

OTHER PUBLICATIONS

Chinese Office Action dated Mar. 23, 2010, issued in corresponding Chinese Application No. 200810133626.4, with English translation.
Office Action (3 pgs.) dated Jan. 5, 2011 issued in corresponding Japanese Application No. 2007-185198 with an at least partial English-language translation thereof (2 pgs.).

* cited by examiner

*Primary Examiner* — Zelalem Eshete
(74) *Attorney, Agent, or Firm* — Nixon & Vanderhye P.C.

(57) ABSTRACT

When a valve timing is held, even if a Duty value of an operational signal of a variable valve timing controller is slightly changed, a holding unresponsive range will be arisen. In the unresponsive range, a variation speed of the valve timing is very small. As temperature is decreased, the unresponsive range is extended and an individual difference becomes notable. While the valve timing is held, a computer learns a deviation amount of a response characteristic of the valve timing based on a variation speed of the valve timing when the Duty value is slightly changed from the holding unresponsive range to outside thereof.

8 Claims, 16 Drawing Sheets

FIG. 7A
FIG. 7B
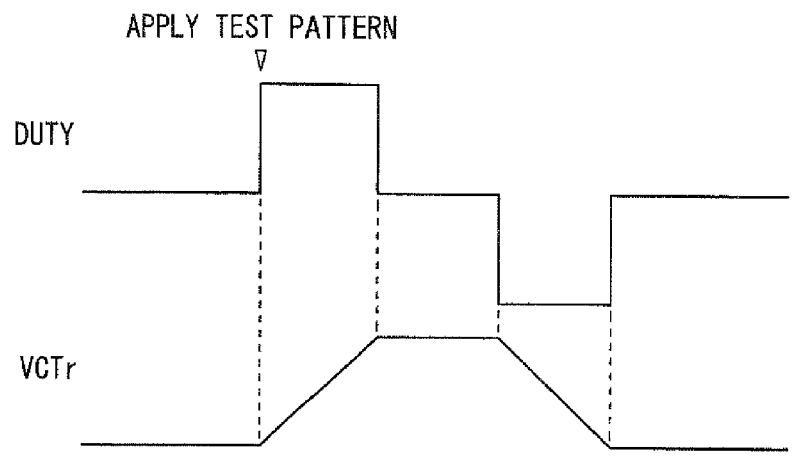
FIG. 7C
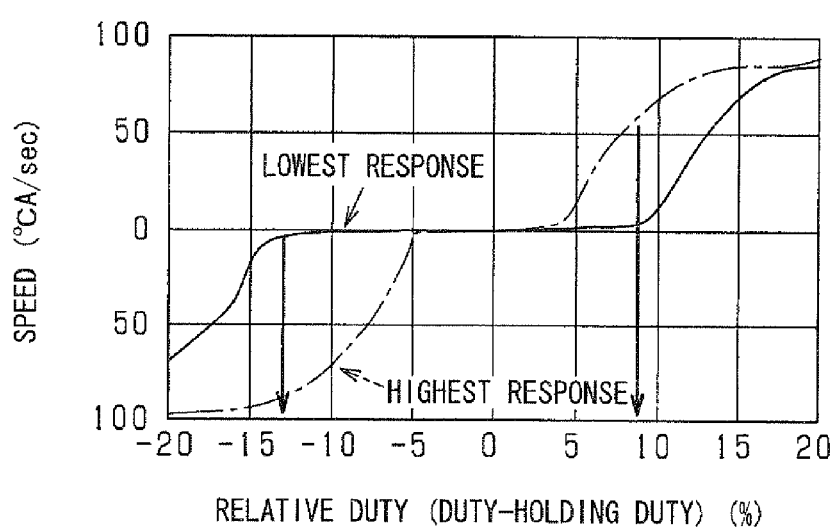

(BEFORE CORRECTION)

(AFTER CORRECTION)

FIG. 12A  VCTa
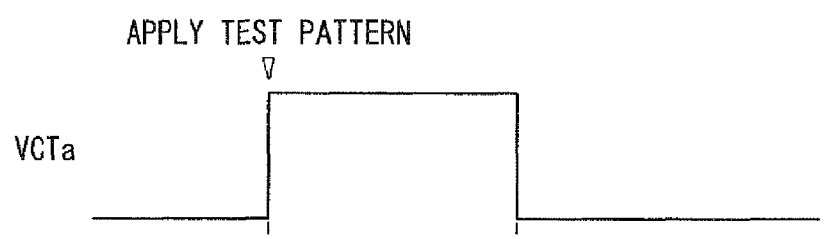
FIG. 12B  DUTY
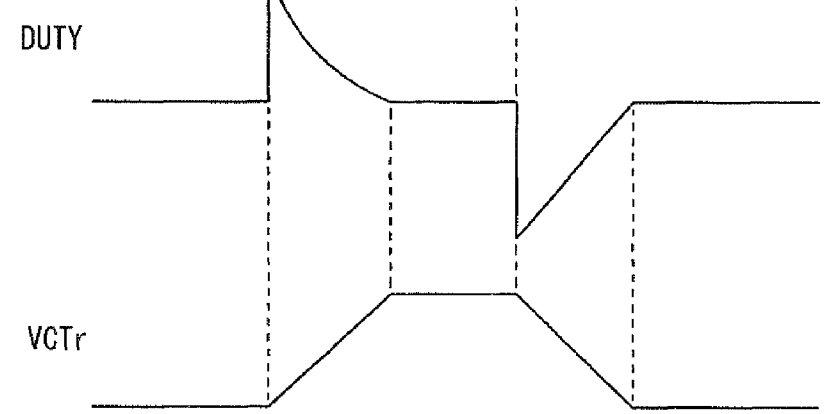
FIG. 12C  VCTr

VALVE CHARACTERISTIC CONTROLLER AND VALVE CHARACTERISTIC CONTROL SYSTEM

CROSS-REFERENCE TO RELATED APPLICATION

This application is based on Japanese Patent Application No. 2007-185198 filed on Jul. 17, 2007, the disclosure of which is incorporated herein by reference.

FIELD OF THE INVENTION

The present invention relates to a valve characteristic controller for an internal combustion engine which is applied to a valve characteristic varying apparatus. The valve characteristic varying apparatus includes a hydraulic valve characteristic varying mechanism and an operation-fluid control means for adjusting a condition of an operation fluid supplied to the hydraulic valve characteristic varying mechanism in order to control a valve characteristic of an engine valve

BACKGROUND OF THE INVENTION

The valve characteristic varying apparatus includes a variable valve timing controller which varies a valve timing of an intake valve and/or an exhaust valve by varying a rotational phase of a camshaft relative to a crankshaft of the engine. The variable valve timing controller includes a first rotational element rotating along with the crankshaft and a second rotational element rotating along with the camshaft. One of these rotational elements is accommodated in the other rotational element to define an oil chamber therebetween. Operation fluid (operation oil) is introduced into the oil chamber. The amount of the operation fluid in the oil chamber is controlled by an oil control valve (OCV) to adjust the rotational phase difference between the first rotational element and a second rotational element.

A response characteristic of the variable valve timing controller disperses due to an individual difference and aging of the OCV and a dispersion of fluid characteristic of the operation oil. Especially, when the engine is in a cold state, viscosity of the operation oil is high and frictional resistance in the variable valve timing controller becomes high. Hence, the response characteristic of the variable valve timing controller may deteriorate, and an adjustable range of the variation speed of the valve timing may become narrower.

JP-2003-254017A (U.S. Pat. No. 6,755,165B2) shows an inching control in which a drive signal and stop signal are alternately compulsorily applied to the OCV while the engine in the cold state, whereby a responsiveness of the variable valve timing controller is improved.

In performing the inching control, it is necessary to adapt the repeating periods of the compulsory drive signal and stop signal and length of each signal, which make the control complicated.

SUMMARY OF THE INVENTION

The present invention is made in view of the above matters, and it is an object of the present invention to provide a valve characteristic controller and a valve characteristic control system which can properly treat a deviation in response characteristic of the valve characteristic varying apparatus.

A valve characteristic controller for an internal combustion engine is applied to a valve characteristic varying apparatus. This valve characteristic varying apparatus includes a hydraulic valve characteristic varying mechanism and an operation-fluid control means for adjusting a condition of an operation fluid supplied to the hydraulic valve characteristic varying mechanism in order to control a valve characteristic of an engine valve. The valve characteristic controller includes a means for obtaining a detection value detected by a detection means which detects the valve characteristic of the engine valve. The valve characteristic controller further includes a learning means for learning a deviation amount of a response characteristic of the valve characteristic varying apparatus based on a temporal variation of the valve characteristic by using of the detection value detected by the detection means as an input, in a situation that a distance between an operational signal of the operation-fluid control means and a holding point where the valve characteristic is held is less than or equal to a specified value.

According to another aspect, the valve characteristic controller includes a learning means for learning a deviation amount of a response characteristic of the valve characteristic varying apparatus based on a temporal variation of the valve characteristic by using of the detection value detected by the detection means as an input. The learning means performs a learning by compulsorily varying an operational signal of the operation-fluid control means without respect to a valve characteristic which is required from a driving condition of the internal combustion engine.

According to another aspect, a valve characteristic controller includes a valve variable mechanism which varies a valve timing of at least one of intake valve and an exhaust valve of an internal combustion engine, and an operation-fluid control means for controlling an operation fluid supplied to the valve variable mechanism. The controller further includes a control means for outputting a control signal for controlling the operation-fluid control means, a detection means for detecting a valve timing of the internal combustion engine, and a learning means for learning the control signal outputted from the control means when the valve timing is rapidly changed from a stable condition based on a temporal variation of the valve timing detected by the detection means.

BRIEF DESCRIPTION OF THE DRAWINGS

Other objects, features and advantages of the present invention will become more apparent from the following description made with reference to the accompanying drawings, in which like parts are designated by like reference numbers and in which:

FIGS. 7A to 7C are time charts showing a method of defining a Duty value for learning;

FIGS. 12A to 12C are time charts showing a test pattern according to the second embodiment;

DETAILED DESCRIPTION OF EMBODIMENTS

First Embodiment

A first embodiment where a valve characteristic control device and a valve characteristic control system according to the present invention are applied to a variable valve timing controller and a control system for a gasoline engine will be hereinafter described with reference to the accompanying drawings.

Figure 1:
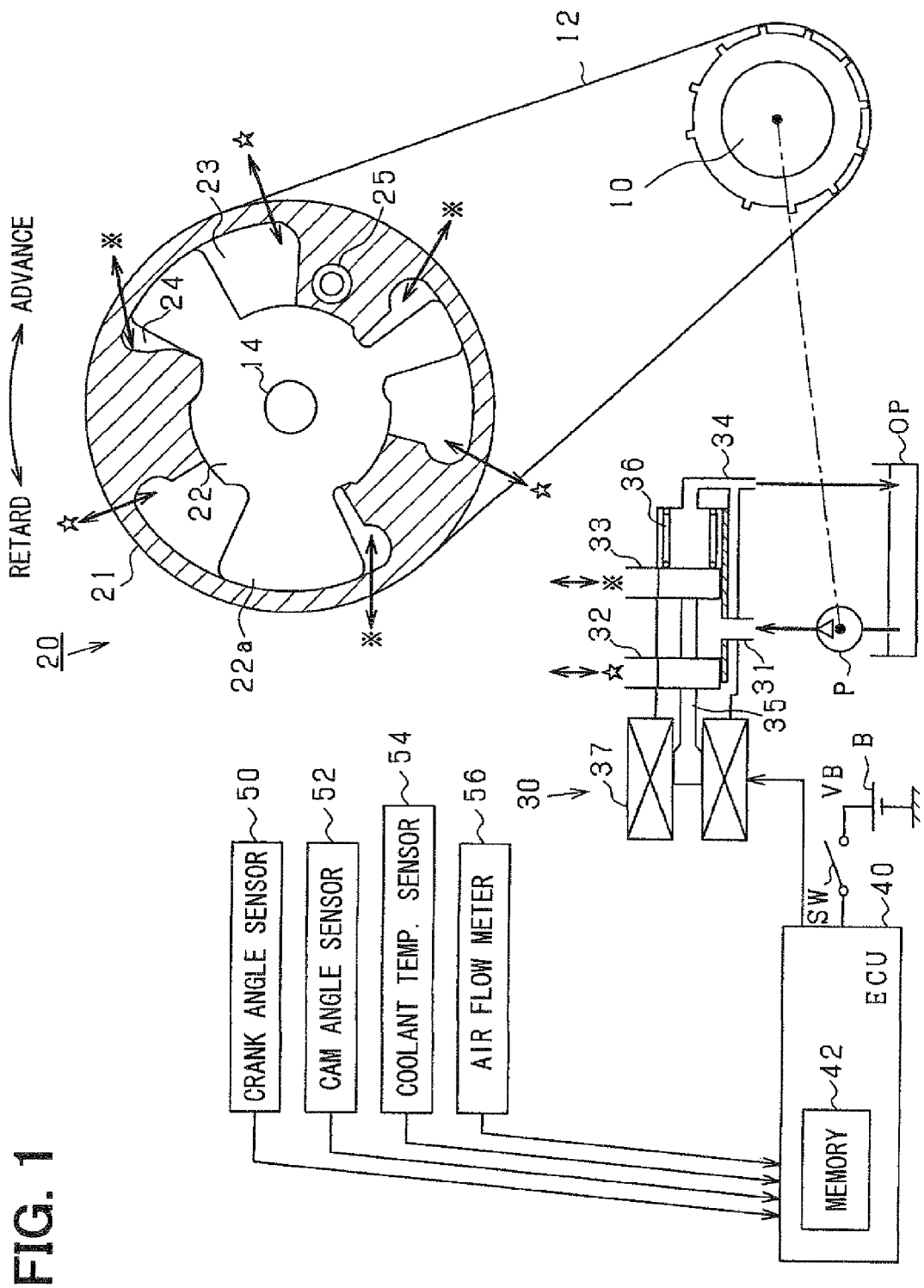
FIG. 1 is a schematic view of an engine control system according to an embodiment of the present invention.

FIG. 1 shows an entire structure of a control system in the first embodiment.

As shown in FIG. 1, power of crankshaft 10 is transmitted through a belt 12 and a variable valve timing mechanism 20 to a camshaft 14. The variable valve timing mechanism 20 is provided with a first rotational element 21 connected mechanically to the crank shaft 10 and a second rotational element 22 connected mechanically to the cam shaft 14. The second rotational element 22 is provided with a plurality of projections 22a and also is accommodated in the first rotational element 21. A retard chamber 23 and an advance chamber 24 are defined between the projection 22a of the second rotational element 22 and an inner wall of the first rotational element 21. The retard chamber 23 is provided for retarding a relative rotational angle (rotational phase difference) of the camshaft 14 to the crankshaft 10 and the advance chamber 24 is provided for advancing the relative rotational angle. The variable valve timing mechanism 20 is further provided with a lock mechanism 25 for fixing the first rotational element 21 and the second rotational element 22 at a rotational phase difference (maximum retard position) where a volume of the retard chamber 23 is maximized.

The variable valve timing mechanism 20 is hydraulically driven by outflow and inflow of oil between the retard chamber 23 and the advance chamber 24. This outflow and the inflow of the oil are adjusted by an oil control valve (OCV) 30.

The OCV 30 supplies the oil through a supply path 31 and a retard path 32 or an advance path 33 from a hydraulic pump (not shown) to the retard chamber 23 or the advance chamber 24. In addition, the OCV 30 discharges the oil through the retard path 32 or the advance path 33 and a discharge path 34 from the retard chamber 23 or the advance chamber 24 to an oil pan (not shown). A flow path area of the retard path 32 or the advance path 33 and a flow path area of the supply path 31 or the discharge path 34 are adjusted by a spool 35. That is, the spool 35 is urged to the left side in FIG. 1 by a spring 36 and also receives force for being moved to the right side in FIG. 1 from an electromagnetic solenoid 37. Therefore, a displacement amount of the spool 35 can be operated by applying an operational signal to the electromagnetic solenoid 37 and also adjusting duty of this operational signal.

Control of the rotational phase difference by operating the OCV 30 is performed by an electronic control unit (ECU 40). The ECU 40 is structured mainly of a microcomputer. The ECU 40 incorporates detection values representative of various operating conditions of an internal combustion engine, such as a detection value of a crank angle sensor 50 for detecting a rotational angle of the crank shaft 10, a detection value of a cam angle sensor 52 for detecting a rotational angle of the cam shaft 14 a detection value of a coolant temperature sensor 54 for detecting a coolant temperature of the engine, and a detection value of an air flow meter 56 for detecting an intake airflow rate. Then, the ECU 40 performs various calculations based upon these detection values and operates various actuators of the internal combustion engine such as OCV 30 based upon the calculation result.

The ECU 40 is provided with various memories such as a constant storage holding memory 42 for storing and holding data used for the various calculations. The constant storage holding memory 42 is a memory which constantly holds data regardless of presence/absence of an actuating switch of the ECU 40. As the constant storage holding memory 42, there is exemplified a backup memory which is constantly in a power supply state regardless of a state of the actuating switch of the ECU 40 or a memory (EEPROM or the like) which holds data regardless of presence/absence of the power supply.

Hereinafter, control of the rotational phase difference by the ECU 40 will be described in detail.

When the force with which the spring 36 urges the spool 35 to the right direction in FIG. 1 is greater than the force with which a magnetic field of the electromagnetic solenoid 37 displaces the spool 35 in the reverse direction, the spool 35 is displaced in the left direction in FIG. 1. When the spool 35 is displaced to a further left side than a position shown in FIG. 1, the oil is supplied through the supply path 31 and the retard path 32 from the hydraulic pump to the retard chamber 23 and also is discharged through the advance path 33 and the discharge path 34 from the advance chamber 24 to the oil pan. Thereby the second rotational element 22 is rotated in a counterclockwise direction in FIG. 1.

When the force with which the magnetic field of the electromagnetic solenoid 37 displaces the spool 35 to the right direction is greater than the force with which the spring 36 urges the spool 35 to the left direction in FIG. 1, the spool 35 is displaced in the right direction in FIG. 1. When the spool 35 is displaced to a further right side than a position shown in FIG. 1, the oil is supplied through the supply path 31 and the advance path 33 from the hydraulic pump to the advance chamber 24 and also is discharged through the retard path 32 and the discharge path 34 from the retard chamber 23 to the oil pan. Thereby the second rotational element 22 is rotated in the clockwise direction in FIG. 1.

As shown in FIG. 1, when the spool 35 is placed in a position to close the retard path 32 and the advance path 33, the outflow and inflow of the oil between the retard chamber 23 and the advance chamber 24 are stopped, maintaining the rotational phase difference.

Figure 2:
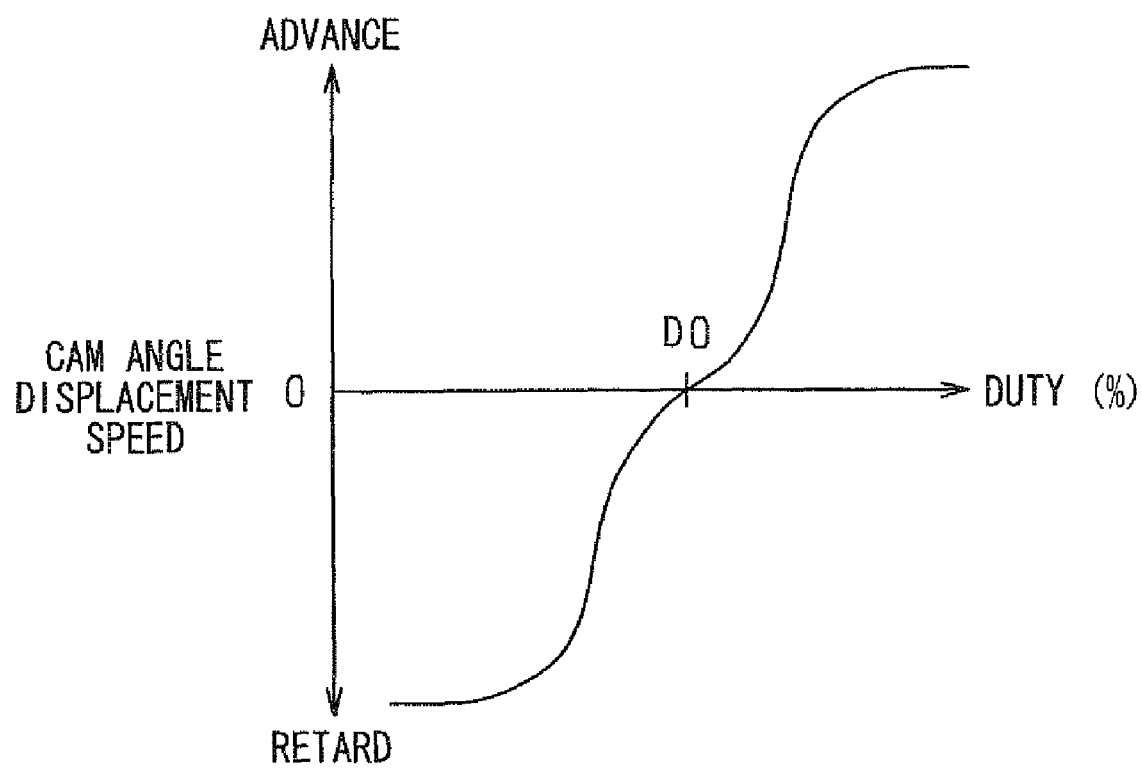
FIG. 2 is a chart showing a relationship between a relation between an operational signal to an OCV and a cam angle displacement speed of the camshaft relative to the crankshaft.

By energizing the electromagnetic solenoid 37 of the OCV 30, the position of the spool 35 is operated to control the rotational phase difference. In this embodiment, the energization of the electromagnetic solenoid 37 is performed by a duty control. In the duty control, the operational signal is periodically varied between ON and OFF, and a ratio between them is adjusted. FIG. 2 shows a relation between Duty of an operational signal to the electromagnetic solenoid 37 and a displacement speed of the camshaft 14 relative to the crankshaft 10.

As shown in FIG. 2, when the value of Duty is "DO", the displacement speed becomes zero. In other words, when the Duty is "DO", the rotational phase difference is maintained. When the Duty is smaller than "DO", the camshaft 14 is displaced to the retard side. As the Duty becomes smaller, the displacement speed in the retard side becomes larger. When the duty is larger than "DO", the camshaft 14 is displaced to the advance side. As the Duty becomes larger, the displacement speed in the advance side becomes larger.

Therefore, "DO", which is the Duty for holding the rotational phase difference, is learned as a holding learning value, and the rotational phase difference is feedback-controlled to the target value on the basis of the holding learning value, thereby appropriately controlling the rotational phase difference to the target value.

Figure 3:
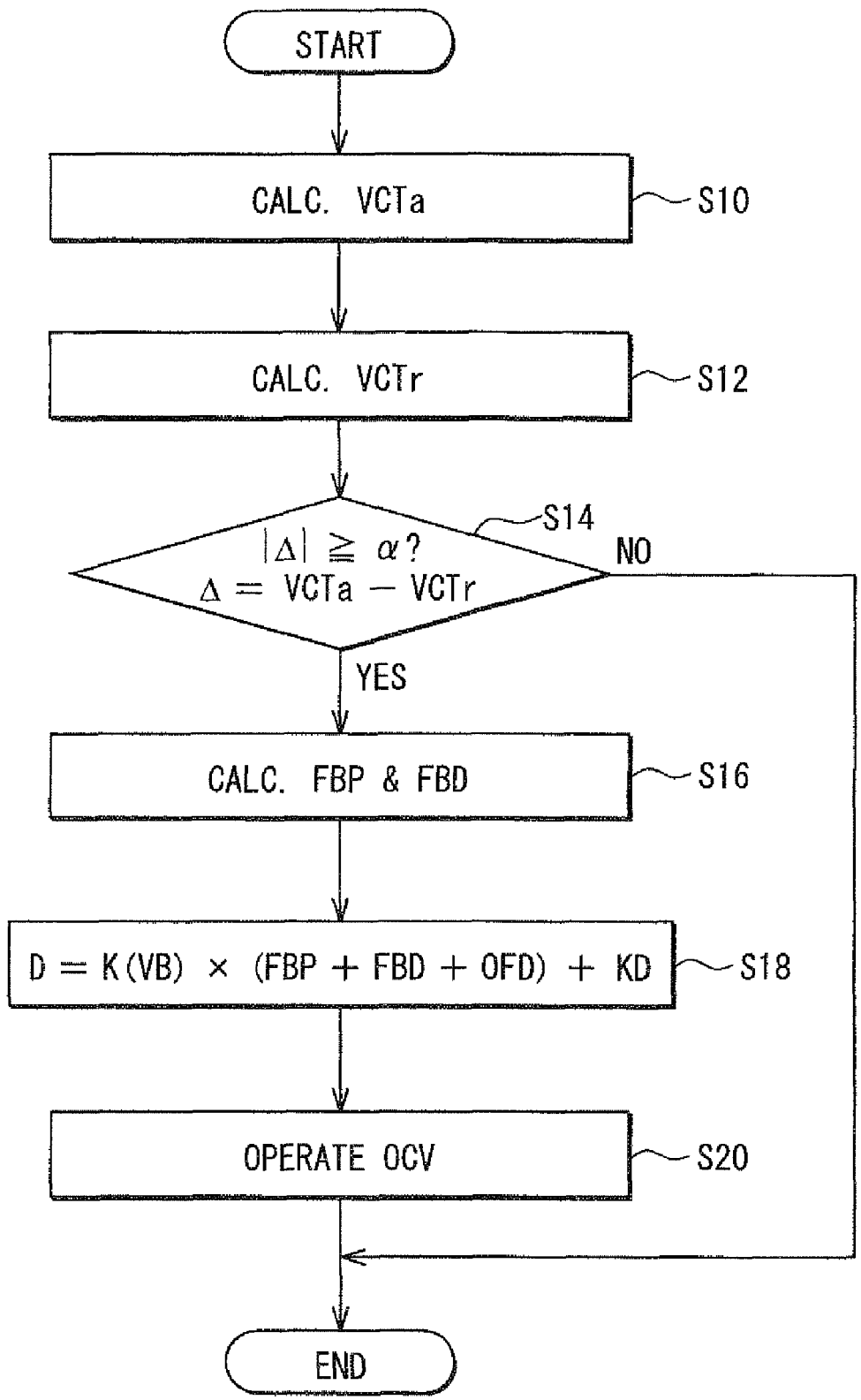
FIG. 3 is a flowchart showing a valve timing control.

FIG. 3 is a flowchart showing a routine for control of the rotational phase difference between the camshaft 14 and the crankshaft 10 in the first embodiment. This routine is repeatedly executed in a predetermined cycle by the ECU 40.

In a series of processes in this routine, in step S10, a target advance value VCTa, which is a target value of a rotational phase difference of the cam shaft 14 to the crank shaft 10, is calculated based upon parameters indicative of an engine operating condition such as a rotational speed of the crank shaft 10 or an intake airflow rate.

In next step S12, an actual advance value VCTr, which is an actual rotational phase difference of the cam shaft 14 to the crank shaft 10, is calculated based upon a detection value of the crank angle sensor 50 and a detection value of the cam angle sensor 52. In next step S14, the computer determines whether an absolute value of a difference between the target advance value VCTa and the actual advance value VCTr is greater than or equal to a predetermined value α. This value α is a threshold for determining whether a transient feedback control is performed based on the actual advance value VCTr and the target advance value VCTa When the answer is Yes in step S14, a feedback control is performed so that the actual advance value VCTr becomes the target advance value VCTa. In step S16, a proportional term FBP and a differential term FBD are computed based on a deviation A between the actual advance value VCTr and the target advance value VCTa. In step S18, the Duty value "D" of the operational signal is computed. The Duty value "D" is defined by a ratio of ON-period in the ON-OFF circle. The Duty value "D" is obtained according to a following formula:

$$D = K(VB) \times (FBP + FBD + OFD) + KD$$

wherein OFD is a correction amount, KD is a holding Duty value, and K(VB) is a correction coefficient for compensating change in voltage VB of a battery B. Even if the voltage of the battery B is changed from a normal value (for example, 14V) so that energy supplied to the OCV 30 is changed, such a change in energy is compensated to supply constant energy to the OCV 30. In step S20, the OCV 30 is operated based on the Duty value "D".

When the answer is No in step S14 or when a process in step S20 is completed, the process is terminated.

Figure 4:
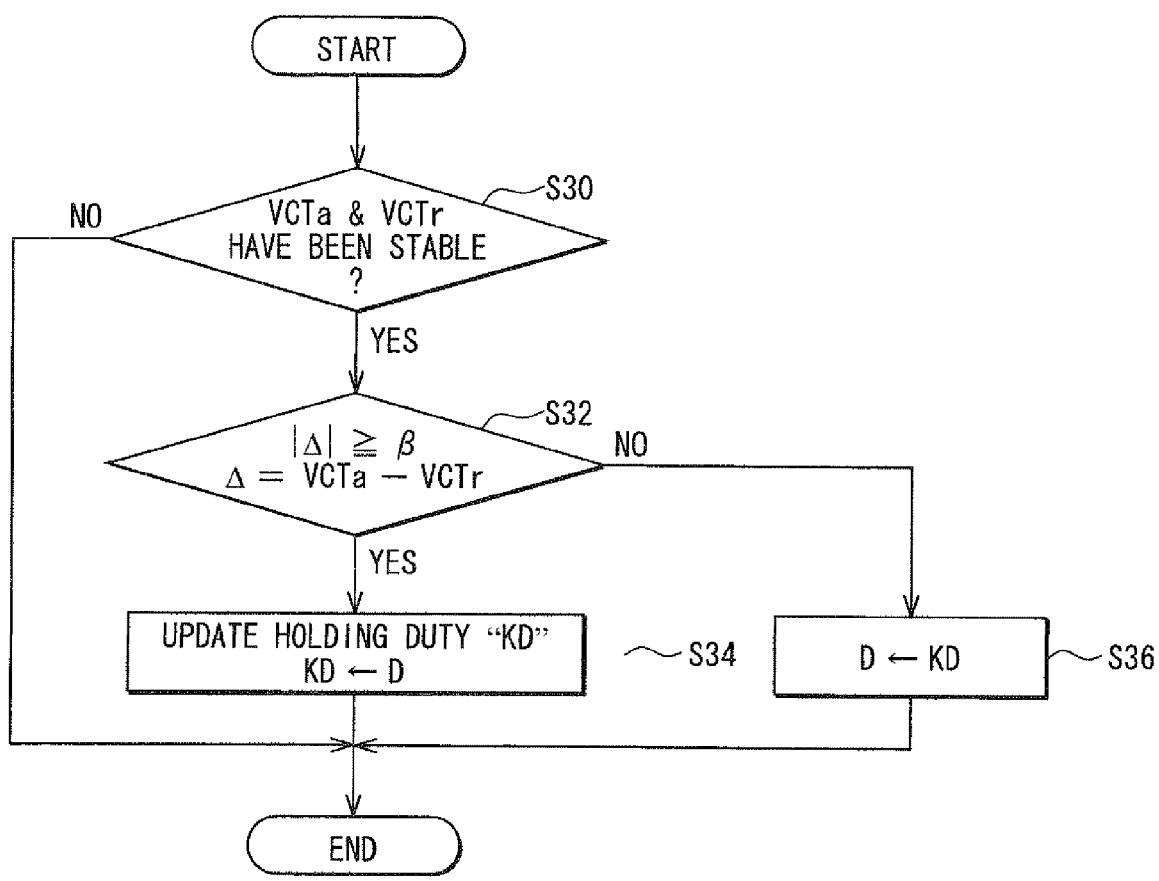
FIG. 4 is a flowchart showing a holding Duty learning process.

FIG. 4 is a flowchart showing a learning process of the holding Duty value KD. This process is performed repeatedly in a predetermined circle.

In step S30, the computer determines whether the target advance value VCTa and the actual advance value VCTr have been stable for a predetermined time period. This process is for determining whether the feedback control is converged. The computer determines whether these advance values are stable according to whether the variation amounts of these values are less than specified values. When the answer is Yes in step S30, the procedure proceeds to step S32.

In step S32, the computer determines whether an absolute value of a deviation Δ between the actual advance value VCTr and the target advance value VCTa is greater than or equal to a specified value β. This process is for determining whether a constant difference is arisen between the actual advance value VCTr and the target advance value VCTa due to the feedback control. The specified value β is defined so as to determine whether the constant difference arises. When the answer is Yes in step S321 that is, when the computer determines the constant difference is arose between the actual advance value VCTr and the target advance value VCTa, the procedure proceeds to step S34.

In step S34, the holding Duty value "KD" is updated. That is, when a constant difference is arose in spite of performing the feedback control shown in FIG. 3, it is considered that the holding Duty value KD deviates from an appropriate value. Thus, the holding Duty value is updated. In this step, the holding Duty value is updated to a current Duty value "D". Thereby, the difference between the target advance value VCTa and the actual advance value VCTr can be reduced. If the current Duty value "D" is excessively large, the Duty value "D" is updated by the feedback control shown in FIG. 3.

When the answer is No is step S32, the procedure proceeds to step S36 in which the Duty value "D" is set to the holding Duty value KD. When the answer is No in step S30, or when the processes in step S34 or S36 is completed, the process is terminated.

The relationship (response characteristic) between the Duty value "D" and the actual advance value VCTr is varied due to an individual difference, aging, temperature and the like. Especially, the temperature disperses the response characteristic. Referring to FIG. 5, the dispersion of the response characteristic is described.

Figure 5A:
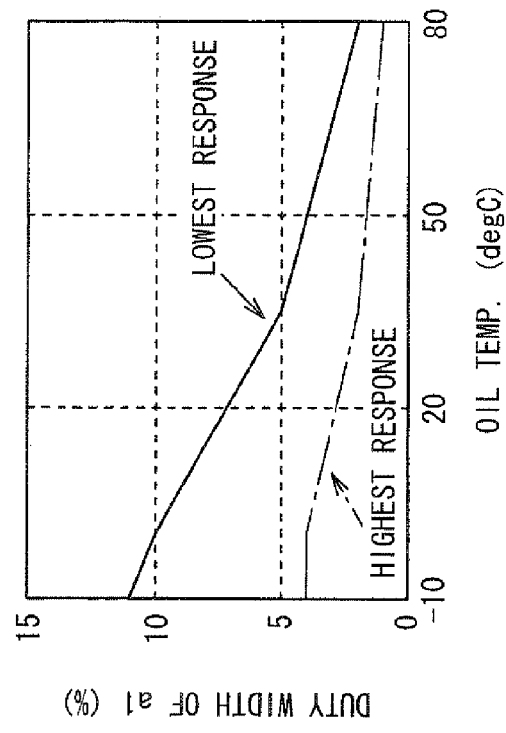
FIGS. 5A to 5D are graphs showing a relationship between a response characteristic of the variable valve timing controller and oil temperature.
Figure 5C:
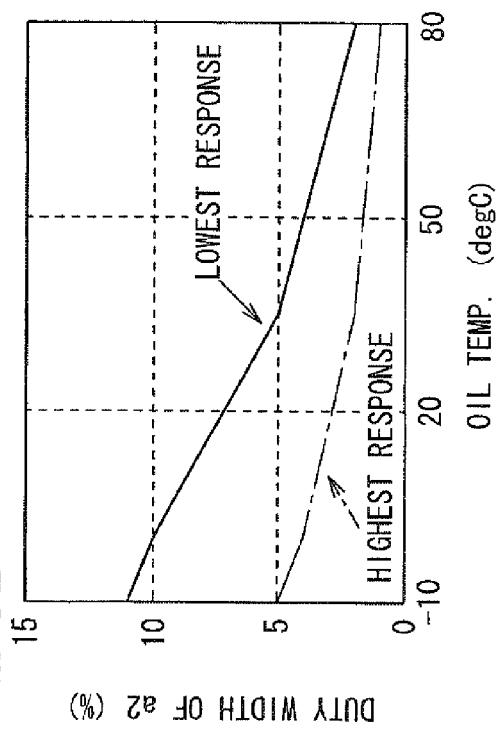
Figure 5B:
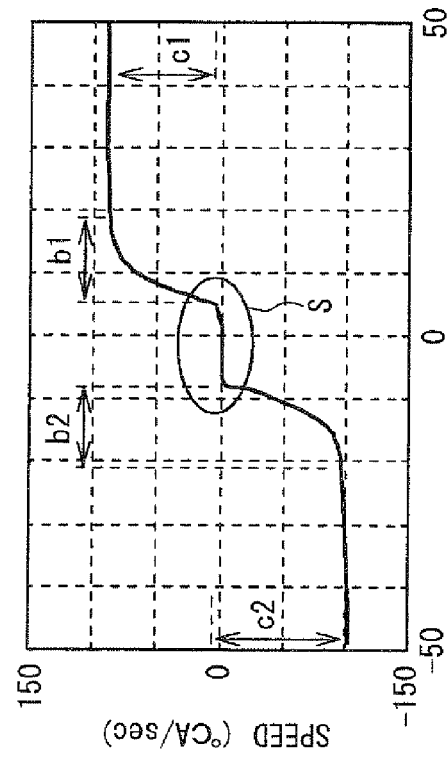

FIGS. 5A and 5B show response characteristics of a variable valve timing controller provided with the variable valve timing mechanism 20 and the OCV 30.

FIG. 5B shows an area S in FIG. 5A in detail. In FIG. 5B, ranges a1 and a2 indicate holding unresponsive ranges where a variation speed of the actual advance value VCTr is very small even if the Duty value "D" is slightly changed under a condition in which the actual advance value VCTr is held with the holding Duty value KD. When the Duty value "D" is changed from the holding Duty value KD, a variation speed of the actual advance value VCTr is rapidly changed at specific points. In a region between the holding Duty value KD and the specific points, the variation speed of the actual advance value VCTr is very low. The range a1 is the holding unresponsive range in retard side and the range a2 is the holding unresponsive range in advance side. In FIG. 5A, ranges b1 and b2 indicate ranges where a variation speed of the actual advance value VCTr is notably changed according to the change in Duty value "D". The range b1 is in retard side and the range b2 is in advance side. c1 and c2 represent maximum speed in the unresponsive ranges where the variation speed of the actual advance value VCTr is scarcely changed. The speed c2 is a speed in retard side, and the speed c1 is a speed in advance side.

Figure 5D:
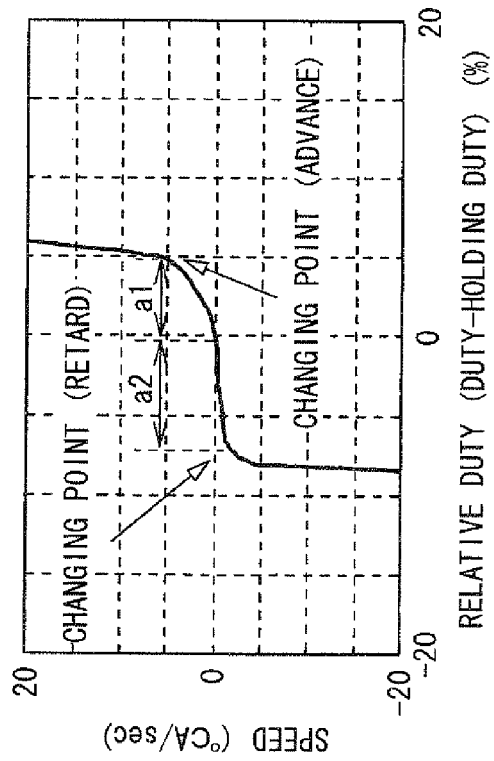

FIGS. 5C and 5D show relationship between the holding unresponsive ranges and operation oil temperature. Alternate long and short dashed lines show width of holding unresponsive range of a variable valve timing controller of which response is highest. Solid lines show width of holding unresponsive range of a variable valve timing controller of which response is lowest. As the operation oil temperature decreases, the width of the holding unresponsive range is enlarged and the variation in width of the holding unresponsive range becomes larger. In a range where the operation oil temperature converges by operating the gasoline engine (over 70° C.), the individual difference in the holding unresponsive range is very small. As the operation oil temperature decreases, the individual difference in holding unresponsive range becomes notable.

As described above, the variation in holding unresponsive range relative to the variation in operation oil temperature is large, and its dispersion due to the individual difference becomes very large. The proportional term FBP and the differential term FBD in the feedback control in FIG. 3 are defined based on the deviation $\Delta$ in consideration of the holding unresponsive range. In a case that the holding unresponsive range is varied due to the temperature and a dispersion of individual difference is very large, a difference between the reference response characteristic and the actual response characteristic becomes large, which may cause a deterioration of controllability.

Figure 6:
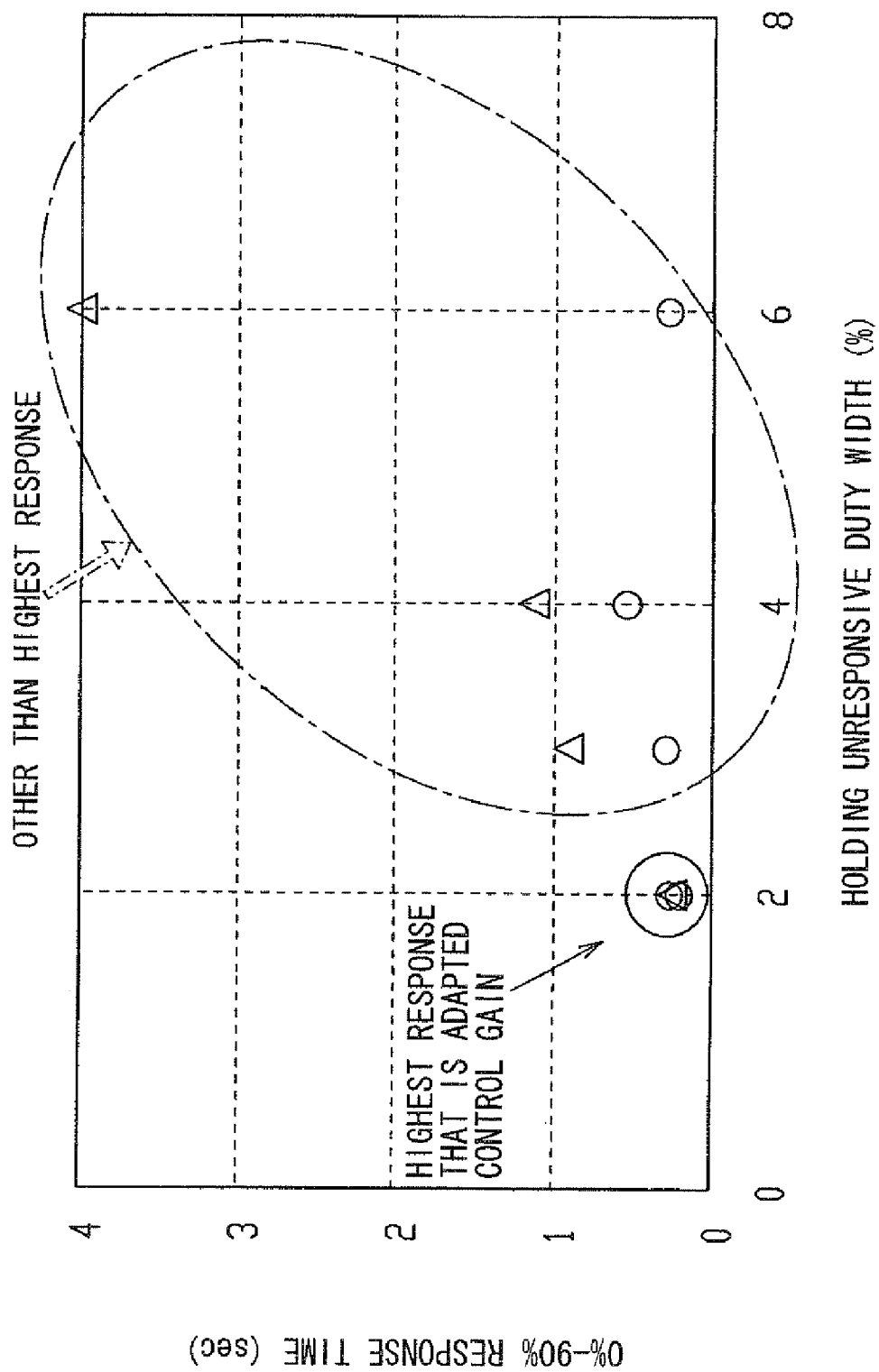
FIG. 6 is a chart showing an influence a holding unresponsive range with respect to a response characteristic of a variable valve timing controller.

FIG. 6 is a chart showing an influence of enlargement of the holding unresponsive range with respect to a variable valve timing controller of which response characteristic is highest. The control is adapted in such a manner that a hunting is restricted with an overshoot amount or an undershoot amount in a permissible range while the target advance value VCTa is changed stepwise. In FIG. 6, circle marks represent reach-time at which 90% of the target advance value VCTa is changed stepwise from 10°CA to 35°CA, and triangle marks represent reach-time at which 90% of the target advance value VCTa is changed stepwise from 10°CA to 17°CA. When the width of the holding unresponsive range is changed, the reach-time is also changed to a large extent. As shown in FIGS. 5A-5D, in a situation that the holding unresponsive range is largely changed according to the temperature, the controllability is deteriorated when the operation oil temperature is low.

In this embodiment, the deviation of the response characteristic due to a deviation of boundary of the holding unresponsive range is quantified and learned. Based on this, the correction amount OFD is computed. Referring to FIGS. 7A-7C, the deviation of the response will be described hereinafter.

In FIG. 7C, an alternate long and short dash line represents a variable valve timing controller of which response characteristic is highest, and a solid line represents a variable valve timing controller of which response characteristic is lowest. The deviation of the variation speed of the actual advance value VCTr is notable when the Duty value "D" is slightly changed into outside of the holding unresponsive range due to a deviation of boundary of the holding unresponsive range. By changing the Duty value between a boundary of the shortest holding unresponsive range and a boundary of the longest holding unresponsive range as shown in FIG. 7C, the deviation amount of the response characteristic due to the deviation of boundary of the holding unresponsive range can be detected.

As shown in FIG. 7A, a test pattern is prepared to change the Duty value as described above. Then, as shown in FIG. 7B, a time change in the actual advance value VCTr is detected. Based on this, the deviation amount of the actual response characteristic from a reference response characteristic which is a reference to control the actual advance value VCTr is quantified and learned.

Figure 8:
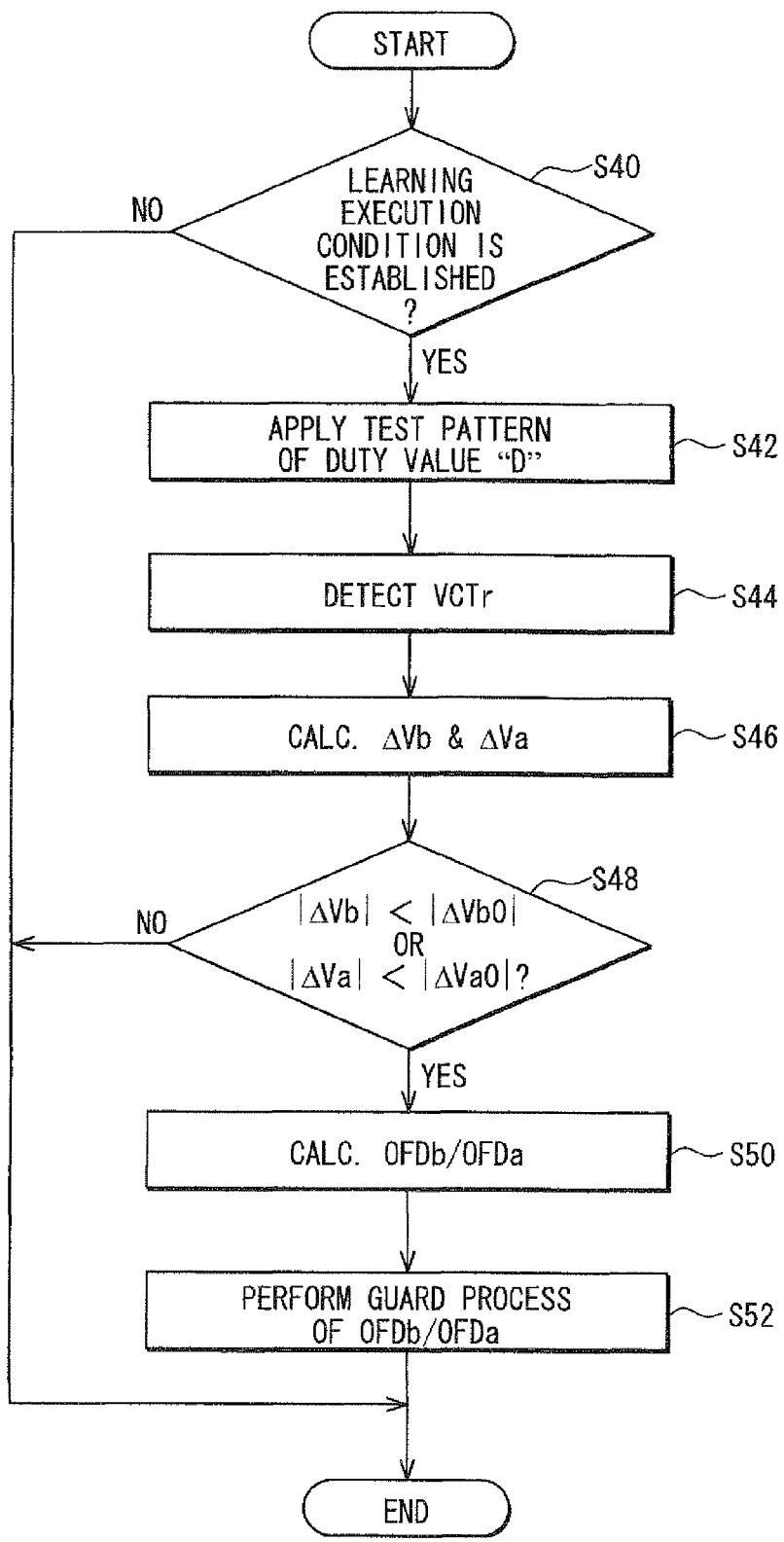
FIG. 8 is a flowchart showing a learning control of a response characteristic.

FIG. 8 is a flowchart showing a learning process of a deviation of the response characteristic. This process is performed repeatedly in a predetermined circle.

In step S40, the computer determines whether a learning execution condition is established. The learning execution condition includes, as example, following conditions.

Condition (a): The coolant temperature detected by the coolant temperature sensor 54 is a specified temperature THW0 ($\leqq$0° C.).

Condition (b): An estimated value of the operation oil temperature is substantially equal to the coolant temperature.

Condition (c): A period during which the engine is stopped before the engine is started at this time is longer than a specified time period Tr. The specified time period Tr is established longer than a time period in which the operation oil temperature is thermally balanced to an ambient temperature of the engine.

Condition (d): The engine speed is substantially equal to a specified speed NE0.

The above conditions (a)-(c) are for determining whether the operation oil temperature is thermally balanced to the ambient temperature. This is for determining whether an estimation accuracy of the operation oil temperature is high. According to a conventional estimation method of the operation oil temperature, an estimation error under 20° C. is arose. In this estimation error range, a response characteristic can be largely changed. In order to estimate the operation oil temperature in the variable valve timing mechanism 20 and the OCV 30, it is required to realize the above thermal balance. When the above conditions are satisfied, the operation oil temperature is accurately represented by the coolant temperature.

In step S42, the test pattern of Duty value "D" shown in FIG. 7A is employed. In step S44, the actual advance value VCTr shown in FIG. 7B is detected. In step S46, a variation speed $\Delta Vb$ in advance direction and a variation speed $\Delta Va$ in retard direction of the actual advance value VCTr are computed. In step S48, the computer determines whether an absolute value of the variation speed $\Delta Vb$ is smaller than an absolute value of a reference speed $\Delta Vb0$ or whether an absolute value of the variation speed $\Delta Va$ is smaller than an absolute value of a reference speed $\Delta Va0$.

The reference speeds $\Delta Vb0$, $\Delta Va0$ are speeds of the variable valve timing controller of which response characteristic is highest. This is related to the fact that the highest response characteristic of the variable valve timing controller is employed as the reference response characteristic for controlling the actual advance value VCTr. In order to restrict the control hunching, the characteristics in which the highest response is reference basis is employed. The reference speeds $\Delta Vb0$, $\Delta Va0$ are stored in the memory 42.

When the answer is Yes in step S48, it is considered that the actual response characteristic is lower than the reference response characteristic in the actual advance value control. The procedure proceeds to step S50. In step S50, a learning value ODFb is computed for compensating a deviation amount of the response characteristic. The learning value OFDb/OFDa is the learning value in advance side, and the learning value OFDa is the learning value in retard side. In step S52, a guard process is performed with respect to the learning value OFDb/OFDa in order that the learning value OFDb/OFDa does not become excessively large. The guard-processed learning value OFDb/OFDa is stored in the memory 42.

When the answer is No in step S40 or S48, the procedure is terminated.

Figure 9:
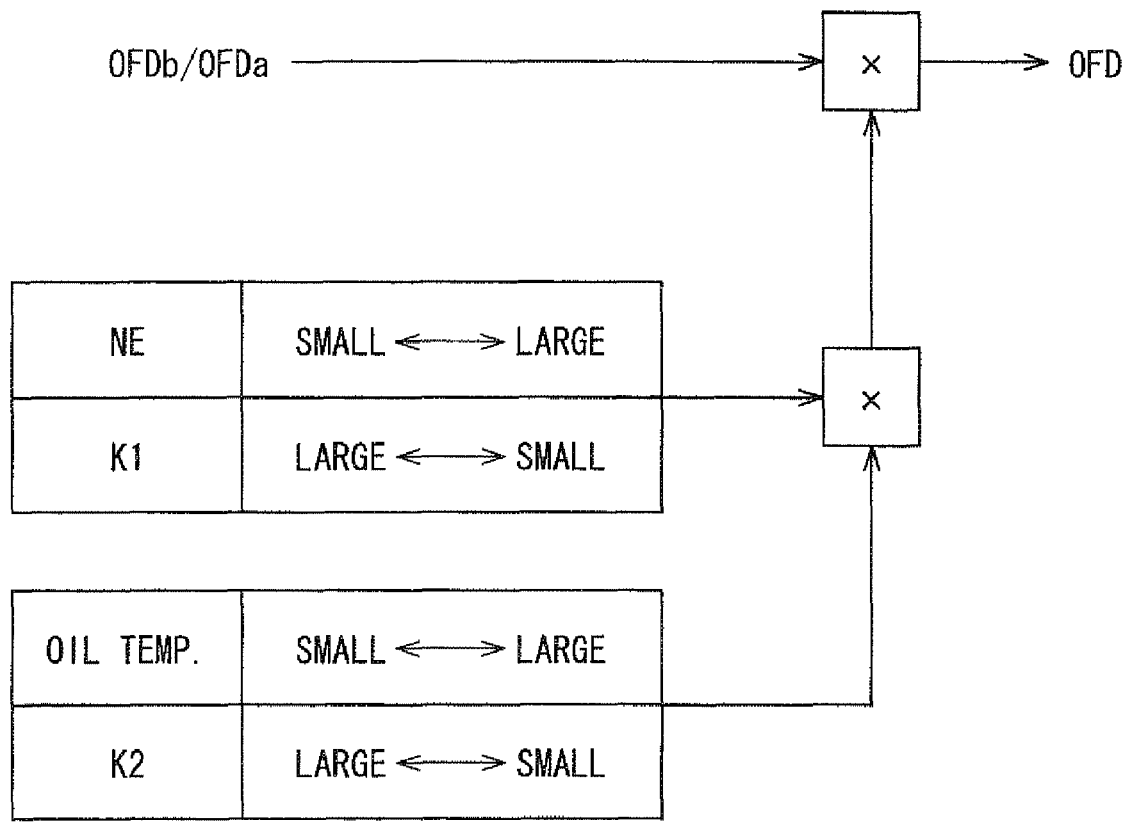
FIG. 9 is a block diagram showing a correction amount computing process.

According to a process shown in FIG. 9 by use of the learning value OFDb/OFDa, the correction amount OFD is computed and the holding Duty value KD is corrected in such a manner as to compensate the deviation of the response characteristic. The correction amount OFD is computed by correcting the learning value OFDb/OFDa with correction coefficients K1 and K2. The correction coefficient K1 is for compensating a variation in response characteristic due to a variation in engine speed. Since, the pump P is driven by the engine, a discharge pressure of the pump P depends on the engine speed. Hence, as the engine speed is lower, the correction coefficient K1 is defined so as to increase an absolute value of the correction amount OFD. The correction coefficient K2 is for compensating a variation in response characteristic due to a variation in operation oil temperature. As the operation oil temperature is lower, the correction coefficient K2 is defined so as to increase the absolute value of the correction amount OFD.

The correction amount OFD depends on the learning value OFDb/OFDa which corresponds to a variation direction of the actual advance value VCT shown in FIG. 2. By using the correction amount OFD in order to set the Duty value "D", the same advantage can be obtained as a case that the holding unresponsive range is narrowed.

Figure 10A:
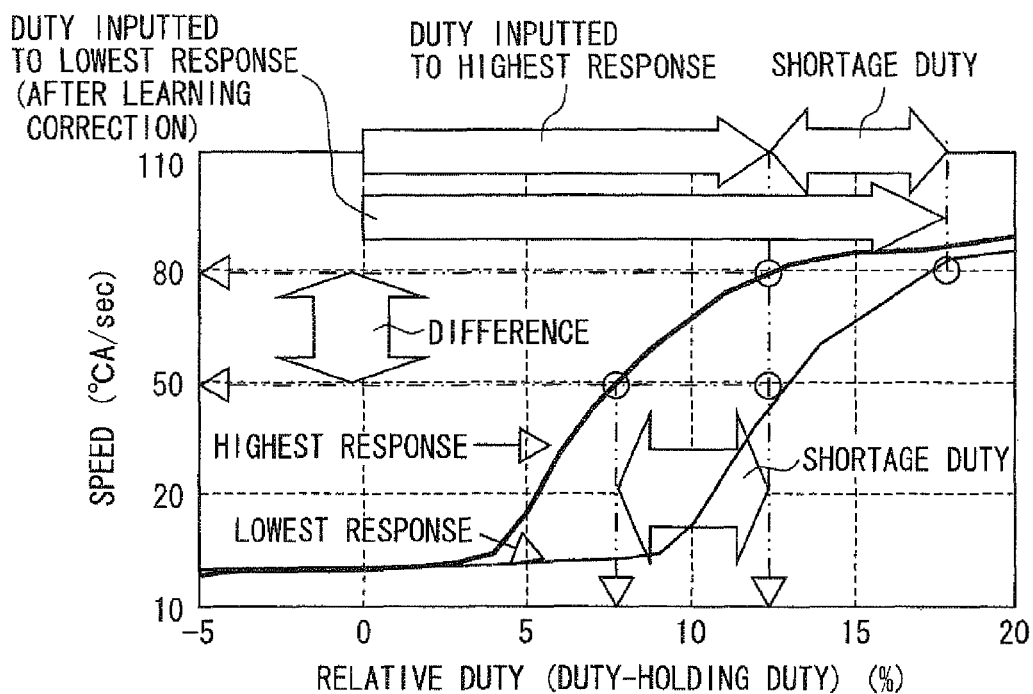
FIGS. 10A to 10C are graphs showing an improvement of a controllability by the correction amount.
Figure 10B:
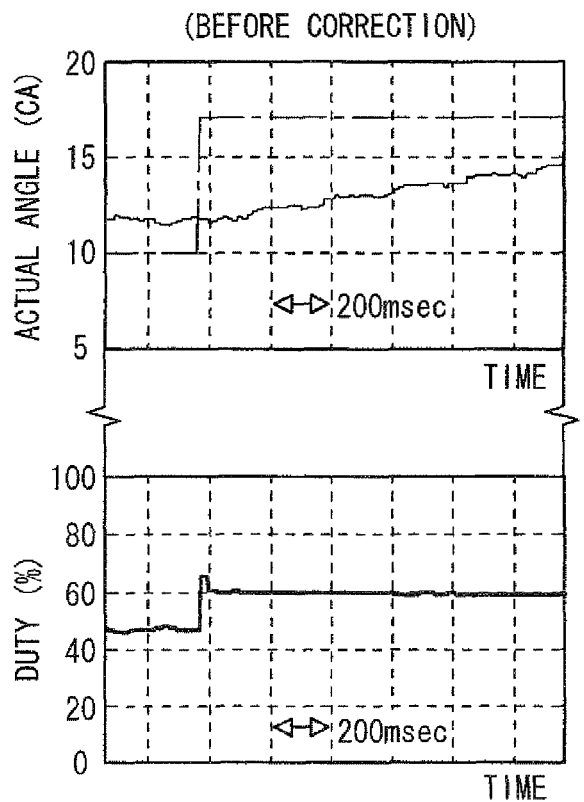
Figure 10C:
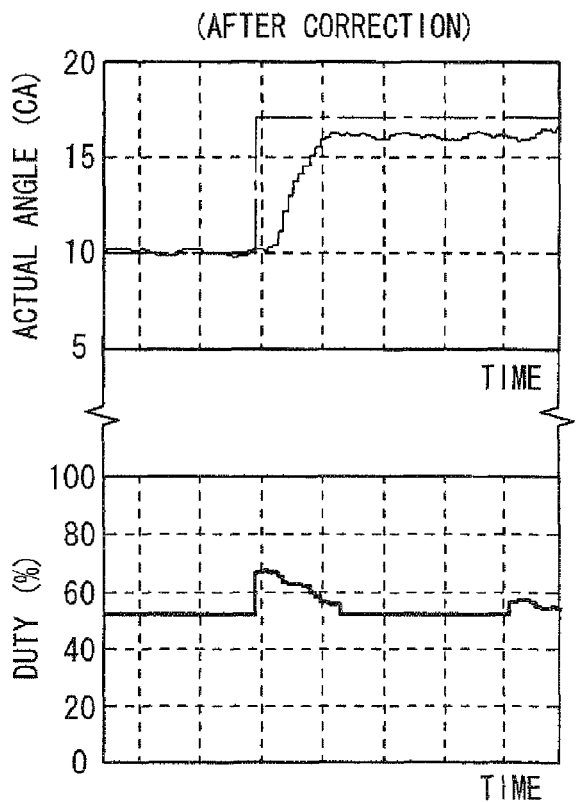

FIGS. 10A-10C show advantages of using the correction amount OFD.

In FIG. 10A, a heavy line represents a reference characteristic and a thin line represents an actual characteristic. The actual speed runs short relative to a speed expected by defining the Duty value "D" indicated by a chain double-dashed line. The Duty value for compensating the shortage of the speed can easily defined based on a difference between the Duty value, which is defined based on the actual speed and the characteristic, and the actual Duty value "D" (the chain double-dashed line).

FIG. 10B shows a followability of the actual advance value VCTr to the target advance value VCTa in a case of using no learning value. FIG. 10C shows a followability of the actual advance value VCTr to the target advance value VCTa in a case of using the learning value. By using the learning value, the followability of the actual advance value VCTr to the target advance value VCTa is improved.

According to the embodiment described above, following advantages can be obtained.

(1) The deviation amount of the response characteristic of the variable valve timing controller is learned based on the variation in the actual advance value VCTr when the Duty value "D" is changed to the outside of the holding unresponsive range. Thereby, the deviation of the response characteristic can be treated properly.

(2) The learning is performed by changing the Duty value "D" according to the test pattern without considering the target advance value VCTa. Thereby, the learning can be performed in a range where the correlation between the variation in actual advance value VCTr and the deviation amount of the response characteristic becomes notable.

(3) The deviation amount of the response characteristic due to a deviation of the boundary of the holding unresponsive range can be quantified as the learning value OFDb/OFDa. Thereby, the learning value OFDb/OFDa represents the deviation amount of the response characteristic.

(4) The learning is performed when the operation oil temperature is around the specified temperature THW0. Thereby, the learning can be performed at the temperature where the dispersion of the boundary of the holding unresponsive range becomes notable (5) The Duty value "D" is defined based on the correction amount OFD in order to control the actual advance value VCTr in such a manner as to compensate the deviation amount. Thereby, the controllability of the valve characteristic can be improved.

(6) The correction amount OFD is defined in consideration of the operation oil temperature. Thereby, the current deviation amount of the response characteristic can be obtained and the Duty value "D" is defined to compensate the current deviation.

(7) The operation oil pressure discharged from the pump P is considered to define the correction amount OFD. Thereby, the current deviation amount is obtained, considering that the deviation amount of the response characteristic is varied due to the difference between the pressure at learning time and the current pressure. The Duty value "D" is defined to compensate the current deviation amount (8) The learning is performed when it is determined that the operation oil temperature is thermally balanced to the ambient temperature. Although the operation oil temperature in the variable valve timing controller 20 and the OCV 30 can not be detected directly, the learning can be performed if the operation oil temperature is estimated accurately.

(9) The learning value OFDb/OFDa is computed in advance side and in retard side respectively. Thereby, the deviation of the response characteristic can be properly treated.

(10) The learning value OFDb/OFDa is computed while the temporal variation in actual advance value VCTr is quantified based on the variation speed of the actual advance angle VCTr. Thereby, the learning can be performed while the temporal variation in actual advance value VCTr is properly quantified.

Second Embodiment

A second embodiment will be described hereinafter, focusing on a difference from the first embodiment.

Figure 11:
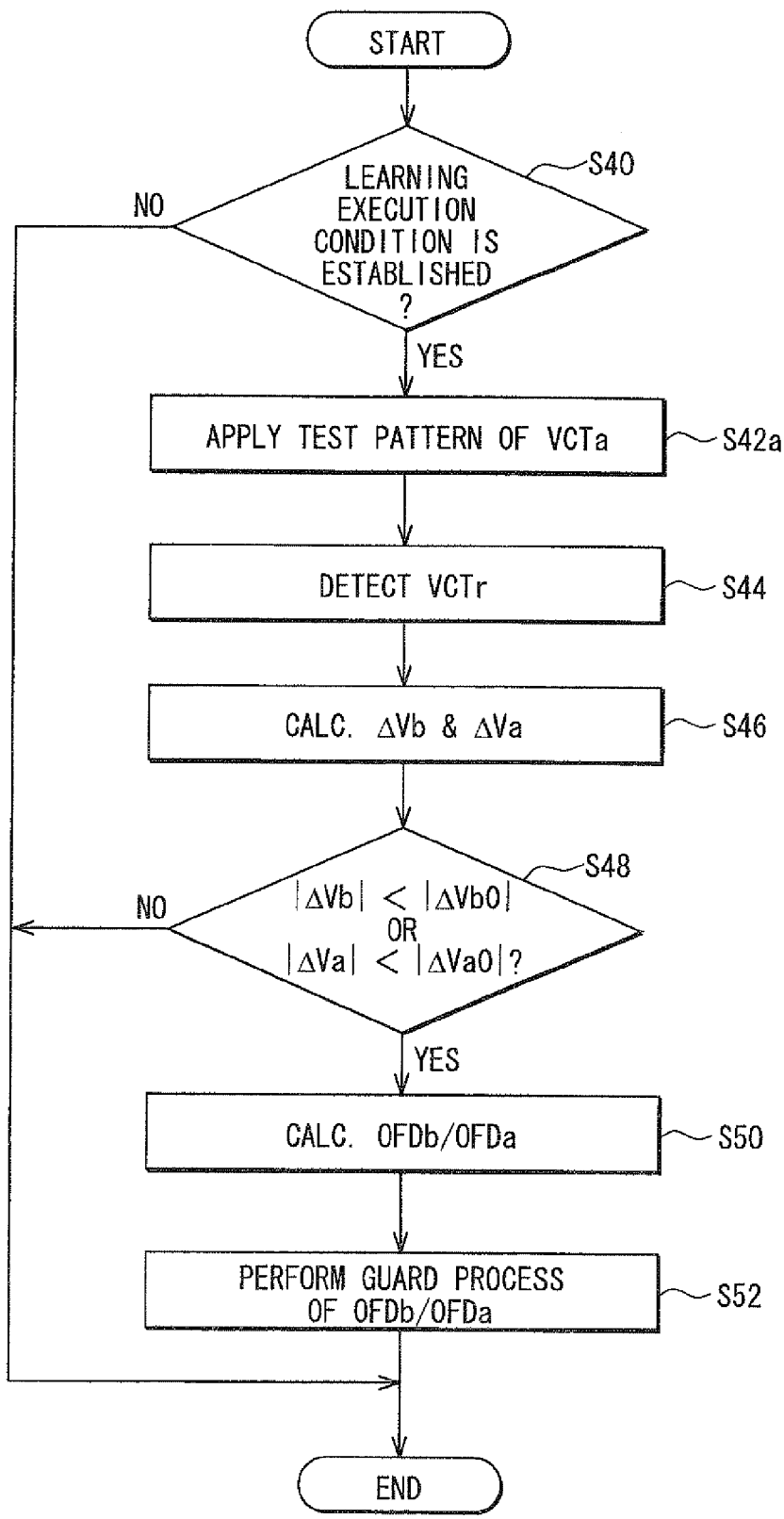
FIG. 11 is a flowchart showing a learning control of a response characteristic according to a second embodiment.

FIG. 11 is a flowchart showing a learning process of the response characteristic deviation. This process is performed repeatedly in a predetermined circle. In FIG. 11, the same processes as those in FIG. 8 are indicated with the same reference numerals.

In step S42a, the target advance value VCTa is defined according to a test pattern for learning. FIG. 12A shows a test pattern, FIG. 12B shows the Duty value "D" for controlling the actual advance value VCTr to the target advance value VCTa, and FIG. 12C shows the actual advance value VCTr. The target advance value VCTa is compulsorily varied to the advance side or the retard side and then returned to the original value after a specified time period has passed. Thereby, the Duty value "D" can be varied from the holding unresponsive range into outside of the range in advance direction and retard direction.

Even if the variable valve timing controller has high response characteristic, it can be avoided that the actual advance value VCTr is excessively varied. It is preferable that the target advance value VCTa is defined in such a manner that the maximum of variation in Duty value "D" becomes the variation in the first embodiment.

According to the second embodiment, following advantages can be obtained besides the above advantages (1)-(10).

(11) The target advance value VCTa is defined according to the test pattern and the actual advance value VCTr is feedback controlled to the target advance value VCTa. Thereby, the learning can be performed while it is avoided that the actual advance value VCTr is excessively varied.

Third Embodiment

A third embodiment will be described hereinafter, focusing on a difference from the second embodiment.

Figure 13:
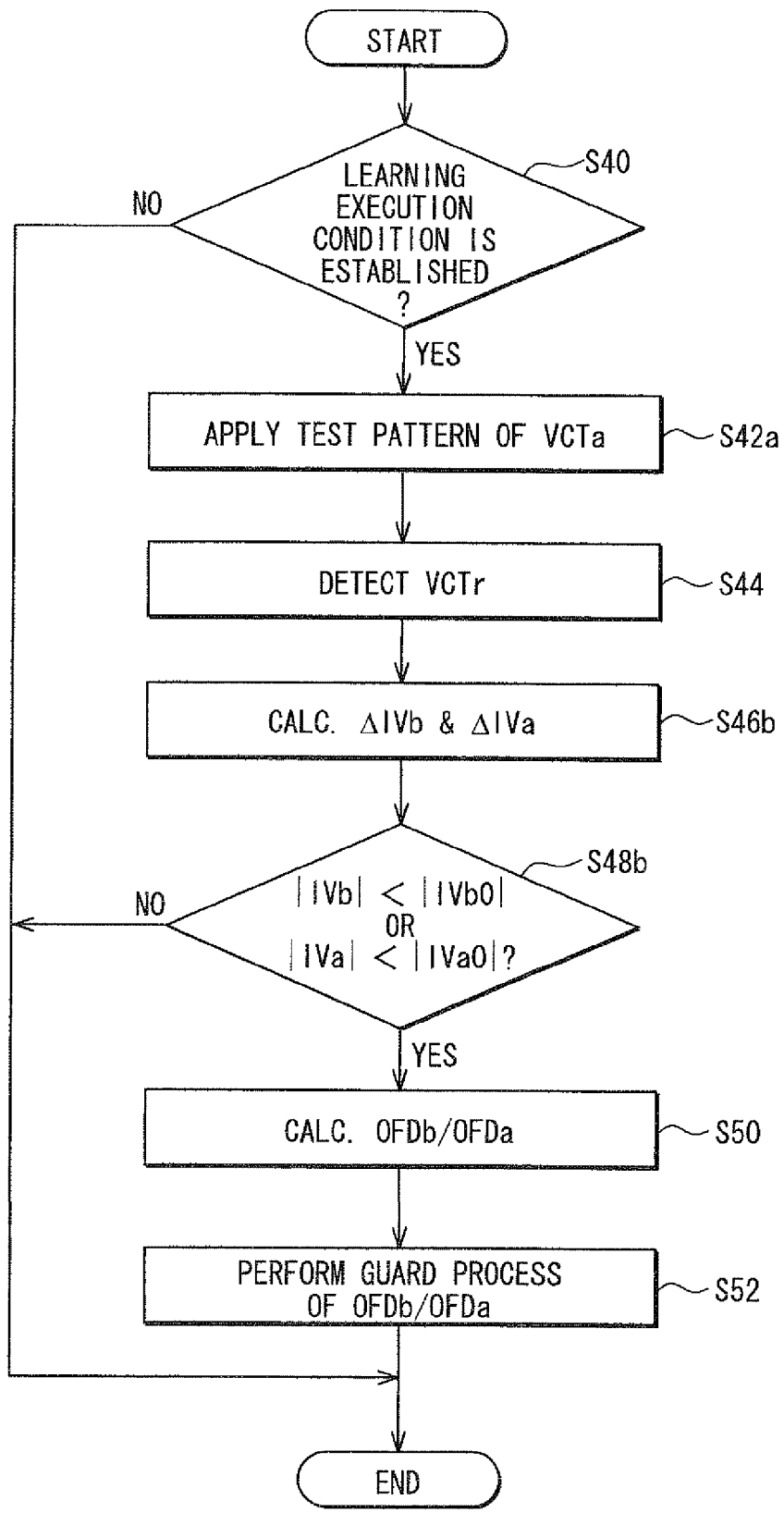
FIG. 13 is a flowchart showing a learning control of a response characteristic according to a third embodiment.

FIG. 13 is a flowchart showing a learning process of the response characteristic deviation. This process is performed repeatedly in a predetermined circle. In FIG. 13, the same processes as those in FIG. 11 are indicated with the same reference numerals.

In step S46b, a time integrated value IVb of the actual advance value VCTr which varies to the advance side and a time integrated value IVa of the actual advance value VCTr which varies to the retard side are computed. The integrated value is defined in such a manner that the actual advance value VCTr before the test pattern is applied is a reference value "0". In step S48b, the computer determines whether an absolute value of the time integrated value IVb is less than an absolute value of a reference integrated value IVb0 or an absolute value of the time integrated value IVa is less than an absolute value of a reference integrated value IVa0. The reference integrated values IVb0, IVa0 are integrated values of the actual advance value VCTr of the variable valve timing controller of which response characteristic is highest. As the response characteristic is higher, the absolute value of the variation speed of the actual advance value VCTr becomes larger. Thus, it is supposed that the integrated value of the actual advance value VCTr becomes large. If the absolute values of the time integrated values IVb and IVa are less than the reference integrated values IVb0 and IVa0, the response characteristic is lower than the reference characteristic. When the answer is Yes in step S48b, the procedure proceeds to step S50.

By quantifying the temporal variation in the actual advance value VCTr with the integral value at the time when the Duty value "D" is varied from the holding unresponsive range into the outside thereof, an influence of the small temporal variation in the actual advance value VCTr, which is shown in FIG. 10B and 10C, are preferably excluded to quantify the temporal variation.

Fourth Embodiment

A fourth embodiment will be described hereinafter, focusing on a difference from the second embodiment.

Figure 14:
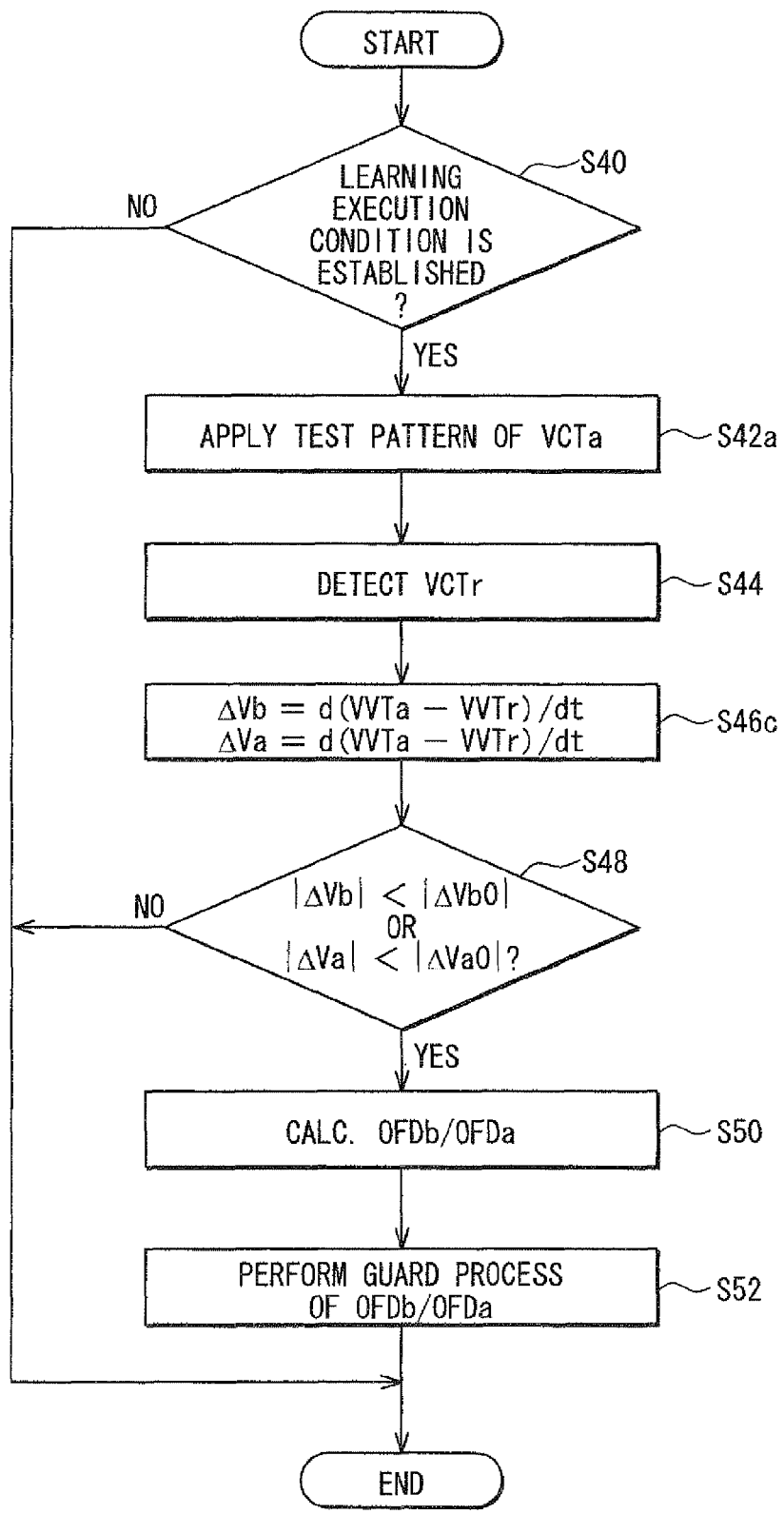
FIG. 14 is a flowchart showing a learning control of a response characteristic according to a fourth embodiment.

FIG. 14 is a flowchart showing a learning process of the response characteristic deviation. This process is performed repeatedly in a predetermined circle. In FIG. 14, the same processes as those in FIG. 11 are indicated with the same reference numerals.

In step S46c, a variation speed ΔVb of difference between the actual advance value VCTr and the target advance value VCTa at the time of advancing the actual advance value VCTr, and a variation speed ΔVb of difference between the actual advance value VCTr and the target advance value VCTa at the time of retarding the actual advance value VCTr. The temporal variation of the actual advance value VCTr is quantified with the variation speed of the difference between the actual advance value VCTr and the target advance value VCTa.

Fifth Embodiment

A fifth embodiment will be described hereinafter, focusing on a difference from the second embodiment.

Figure 15:
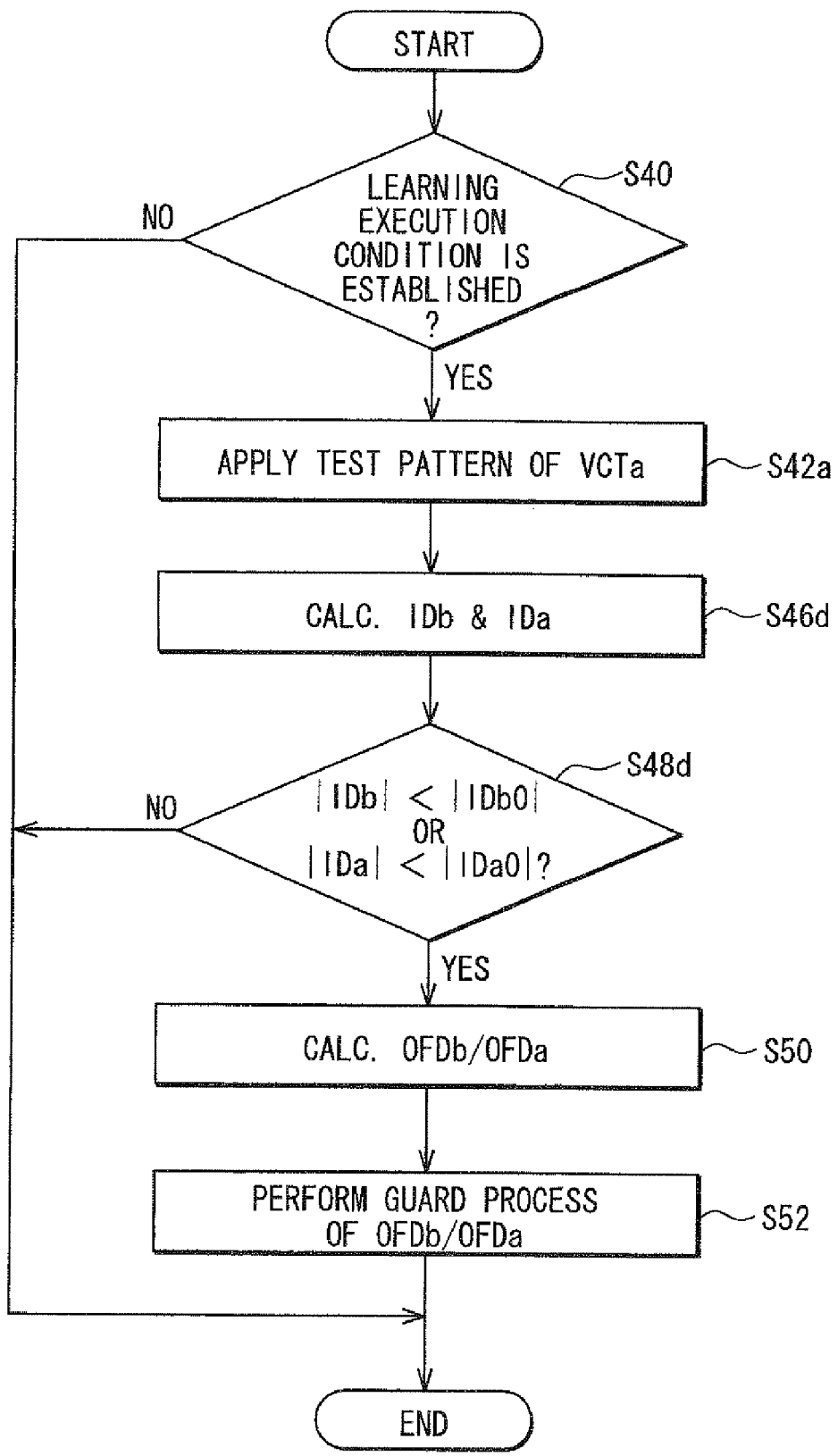
FIG. 15 is a flowchart showing a learning control of a response characteristic according to a fifth embodiment.

FIG. 15 is a flowchart showing a learning process of the response characteristic deviation. This process is performed repeatedly in a predetermined circle. In FIG. 15, the same processes as those in FIG. 11 are indicated with the same reference numerals.

In step S46d, a time integrated value IDb of the Duty value at a time when the actual advance value VCTr advances and a time integrated value IDa of the Duty value at a time when the actual advance value VCTr retards are computed. The integrated value is defined in such a manner that the holding Duty value KD before the test pattern is applied is a reference value "0". In step S48d, the computer determines whether an absolute value of the time integrated value IDb is less than an absolute value of a reference integrated value IDb0 or an absolute value of the time integrated value IDa is less than an absolute value of a reference integrated value IDa0. The reference integrated values IDb0, IDa0 are integrated values of the actual advance value VCTr of the variable valve timing controller of which response characteristic is highest.

The absolute values of the integrated values IDb, IDa have mutual relation with energy which is used for controlling the actual advance value VCTr to the target advance value VCTa. Hence, as the responsiveness is lower, these absolute values become larger. When the answer is Yes in step S48d, the computer determines that the response characteristic deviates from a reference characteristic and the process proceeds to step S50.

The reference integrated values IDa0 and IDb0 are varied according to voltage VB of the battery B. That is, these reference integrated values IDa0 and IDb0 are values at the current voltage VB. When the voltage VB of the battery B is varied, the Duty value "D" is corrected with the correction coefficient K in step S18. Hence, in order to learn a deviation in response characteristic due to the individual difference without any influence of the variation of battery voltage VB, the reference integrated values IDa0 and IDb0 are varied according to the voltage VB.

According to the fifth embodiment, following advantages can be obtained besides the above advantages in the first embodiment and the second embodiment.

(12) The temporal variation of the actual advance value VCTr is quantified and the learning process is performed based on the time integral value of the Duty value "D" for controlling the actual advance value VCTr into the target advance value VCTa which is defined by the test pattern. Generally, in performing a feedback control, the Duty value "D" is not constant. In a situation where the temporal variation of the actual advance value VCTr is used, it is difficult to find which Duty value "D" corresponds to the temporal variation. Furthermore, it may be difficult to find which Duty value "D" corresponds to the deviation amount of the response characteristic. According to the present embodiment, the temporal variation of the actual advance value VCTr is quantified with the time integrated value of the Duty value "D", so that the temporal variation of the actual advance value is appropriately correlated to the deviation of the response characteristic.

Sixth Embodiment

A sixth embodiment will be described hereinafter, focusing on a difference from the fourth embodiment.

Figure 16:
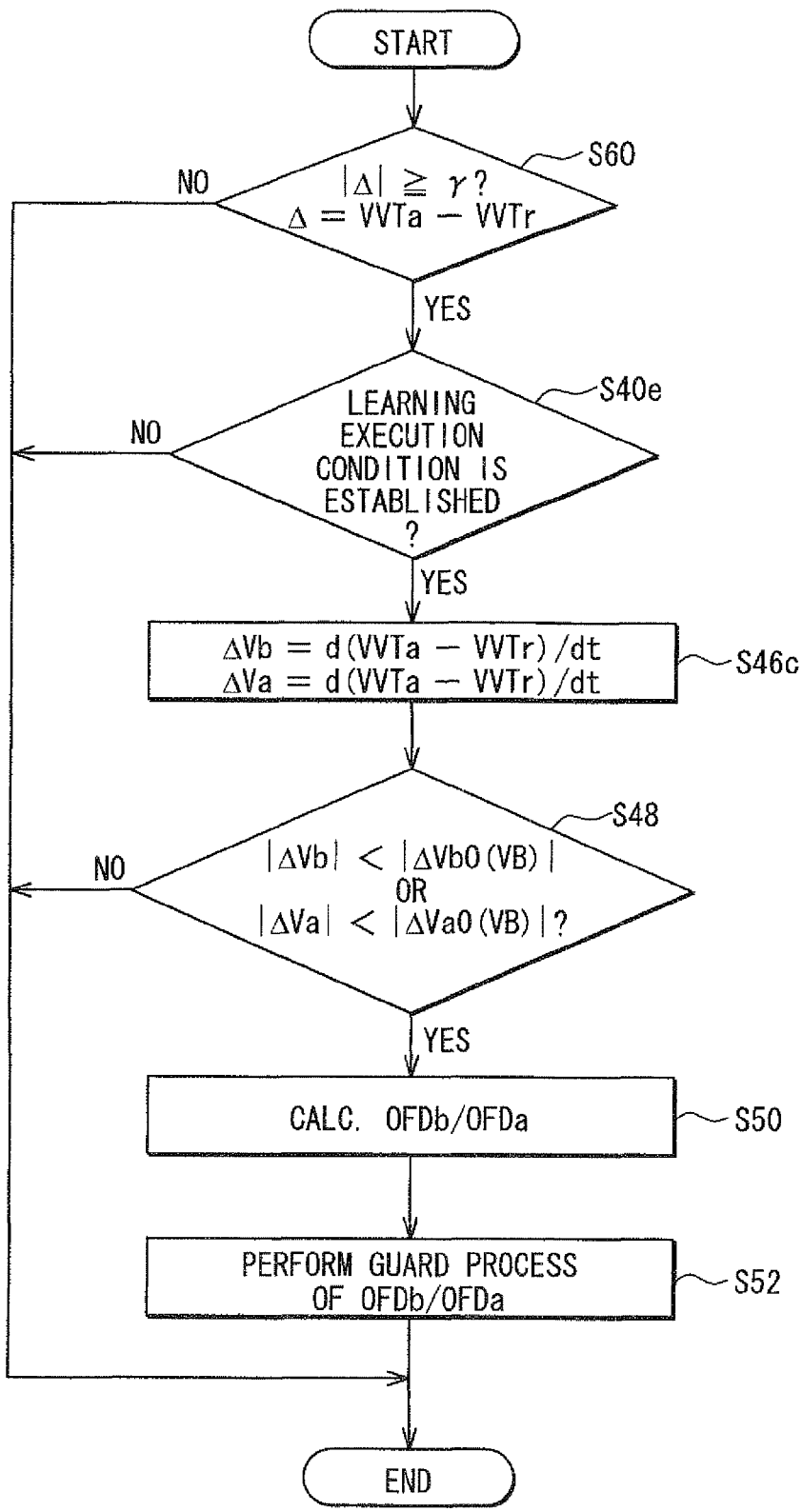
FIG. 16 is a flowchart showing a learning control of a response characteristic according to a sixth embodiment.

FIG. 16 is a flowchart showing a learning process of the response characteristic deviation. This process is performed repeatedly in a predetermined circle. In FIG. 16, the same processes as those in FIG. 14 are indicated with the same reference numerals.

In step S60, the computer determines whether it is necessary to vary the actual advance value VCTr to the target advance value VCTa which has been changed while the actual advance value VCTr is hold. When the answer is Yes in step S60, the procedure proceeds to step S40e in which the computer determines whether a learning execution condition is established. In addition to the conditions in the fourth embodiment, the learning execution condition includes following condition: An absolute value of a variation amount AD of the Duty value "D" for varying the actual advance value VCTr from the holding condition is less than a specified value ε. This condition is for determining whether the current variation in Duty value is within a range where the variation in variation speed of the actual advance value VCTr relative to the variation in Duty value "D" is notable. If this condition is satisfied, it is considered that the current temporal variation of the actual advance value VCTr has a strong relationship to the response characteristic due to the deviation of the holding unresponsive range. In order to perform the learning only when the learning condition is satisfied, the procedure proceeds to step S46c when the answer is Yes in step S40e.

Other Embodiments

The above-mentioned embodiments may be modified as follows:
The second, third, and fifth embodiments can be modified in the same way as the sixth embodiment relative to the fourth embodiment.
In the fourth embodiment, an integral value of the deviation can be used instead of the variation speed of the deviation Δ.
In the fourth embodiment, the variation speeds ΔVb and ΔVa include a variation in target advance value VCTa. Even if the target advance value VCTa is not only one value, the deviation amount of the response characteristic can be reflected properly. Hence, the test pattern is not always only one pattern. In the fifth embodiment, the learning can be performed by use of the variation speed of the Duty value "D" in the holding unresponsive range after largely changed instead of the integral value of the Duty value "D".
The compensation method of the variation in voltage VB is not limited to the fourth embodiment. For example, one or two of the proportional term FBP, the differential term FBD and the correction amount OFD can be corrected based on the voltage VB. Furthermore, the feedback control can be performed irrespective of the voltage VB without using the correction coefficient K. In this case, the reference value for learning is constant irrespective of the voltage VB, whereby the learning value OFDa/OFDb includes the deviation of the response characteristic due to the variation in voltage VB. Thereby, the variation in voltage VB can be compensated by the learning value OFDa/OFDb.
The learning method of the response characteristic deviation under a condition where difference between the holding Duty value KD and the Duty value "D" is less than a specified value is not limited to the above embodiments. For example, the learning can be performed under a condition where the actual Duty value "D" is fixed. The difference between the Duty value "D" and the holding duty value KD is less than a specified value.
The method of quantifying the temporal variation in valve characteristic while removing the influence of a small variation in actual advance value VCTr is not limited to the method in which the actual advance value VCTr and the integral value of the deviation Δ. For example, the variation speed can be computed or the variation speed of the deviation Δ can be computed after a moderating process such as filtering.
It may be determined that the operation oil temperature is thermally balanced to ambient-temperature when the coolant temperature is substantially equal to the ambient temperature.

The condition where the operation oil temperature is thermally balanced to the ambient temperature can be excluded from the learning execution condition. In this case, it is preferable to provide with a detecting means for directly detecting the operation oil temperature in the OCV 30 and the variable valve timing mechanism 20.
The condition with respect to the engine speed can be excluded from the learning execution condition. The oil pump P driven by the engine can be replaced by an electric oil pump of which discharge pressure is constant. When using the electric oil pump, the correction amount OFD can be computed accurately without correcting the learning value OFDb/OFDa.
In the above embodiments, the learning of the response characteristic deviation is performed only in a situation that the operation oil temperature (coolant temperature) is the specified temperature THW0. The temperature range of the operation oil temperature may be divided into a plurality of temperature ranges, and the learning can be performed with respect to each temperature range. In this case, it is preferable that the test pattern is defined with respect to each temperature range. Especially, it is preferable that as the operation oil temperature is lower, the difference between the Duty value "D" and the holding Duty value KD becomes larger.
The method for defining the Duty value "D" is not limited to the method in which the Duty value "D" is defined by correcting the holding Duty value KD. For example, the relationship between the deviation Δ and the proportional term FBP or the differential term FBD.
The learning method of the holding Duty value KD is not limited to the above embodiments. What is necessary is just to have a means for successively learning and updating the operational signal value at the time when the valve characteristic is not changed.
An average response characteristic (center characteristic) can be used as the reference characteristic for controlling the valve characteristic.
The variable valve timing mechanism is not limited to the mechanism shown in FIG. 1. For example the rotational element rotating with the crankshaft 10 can be incorporated in a rotational element rotating with the camshaft 14.
The valve characteristic control device is not limited to the variable valve timing controller. As shown in JP-2001-254639A, the valve characteristic control device may be a valve lift controller which adjusts valve lift amount by operation oil pressure. The oil control valve adjusts the operation oil pressure. It is effective to learn a deviation in responsiveness of the valve characteristic.
The internal combustion engine is not limited to a gasoline engine. A diesel engine can be used.

What is claimed is:
1. A valve characteristic controller for an internal combustion engine which is applied to a valve characteristic varying apparatus including a hydraulic valve characteristic varying mechanism and an operation-fluid control means for adjusting a condition of an operation fluid supplied to the hydraulic valve characteristic varying mechanism in order to control a valve characteristic of an engine valve, the valve characteristic controller comprising:
a means for obtaining a detection value detected by a detection means which detects the valve characteristic of the engine valve; and
a learning means for learning a deviation amount of a response characteristic of the valve characteristic varying apparatus based on a temporal variation of the valve characteristic by using of the detection value detected by the detection means as an input, in a situation that a distance between an operational signal of the operation-fluid control means and a holding point where the valve characteristic is held is less than or equal to a specified value, wherein the specified value is defined in such a manner as to be a distant between a boundary of a holding unresponsive range and the holding point the holding unresponsive range being supposed to be a maximum range from the holding point to a point at which a variation speed of the valve characteristic relative to a variation in the operational signal is rapidly changed.

2. A valve characteristic controller according to claim 1 wherein the learning means perform a learning by compulsorily varying an operational signal of the operation-fluid control means without respect to a valve characteristic which is required from a driving condition of the internal combustion engine.

3. A valve characteristic controller for an internal combustion engine which is applied to a valve characteristic varying apparatus including a hydraulic valve characteristic varying mechanism and an operation-fluid control means for adjusting a condition of an operation fluid supplied to the hydraulic valve characteristic varying mechanism in order to control a valve characteristic of an engine valve, the valve characteristic controller comprising:

a means for obtaining a detection value detected by a detection means which detects the valve characteristic of the engine valve; and a learning means for learning a deviation amount of a response characteristic of the valve characteristic varying apparatus based on a temporal variation of the valve characteristic by using of the detection value detected by the detection means as an input, in a situation that a distance between an operational signal of the operation-fluid control means and a holding point where the valve characteristic is held is less than or equal to a specified value, wherein the learning means performs the learning while the operational signal is within a range from a minimum boundary to a maximum boundary of a response characteristic of the valve characteristic controller in a holding unresponsive range corresponding to a range from a holding point at which the valve characteristic of the engine valve is held to a point at which a variation speed of the valve characteristic relative to a variation in the operational signal is rapidly changed.

4. A valve characteristic controller according to claim 3 wherein the learning means perform a learning by compulsorily varying an operational signal of the operation-fluid control means without respect to a valve characteristic which is required from a driving condition of the internal combustion engine.

5. A method of controlling a valve characteristic for an internal combustion engine which is applied to a valve characteristic varying apparatus including a hydraulic valve characteristic varying mechanism and an operation-fluid controller for adjusting a condition of an operation fluid supplied to the hydraulic valve characteristic varying mechanism in order to control a valve characteristic of an engine valve, the method comprising:

obtaining a detection value corresponding to the valve characteristic of the engine valve; and learning a deviation amount of a response characteristic of the valve characteristic varying apparatus based on a temporal variation of the valve characteristic by using of the detection value as an input, in a situation that a distance between an operational signal of the operation-fluid controller and a holding point where the valve characteristic is held is less than or equal to a specified value, wherein the specified value is defined in such a manner as to be a distant between a boundary of a holding unresponsive range and the holding point the holding unresponsive range being supposed to be a maximum range from the holding point to a point at which a variation speed of the valve characteristic relative to a variation in the operational signal is rapidly changed.

6. A method according to claim 5 wherein the learning is performed by compulsorily varying an operational signal of the operation-fluid controller without respect to a valve characteristic which is required from a driving condition of the internal combustion engine.

7. A method of controlling a valve characteristic for an internal combustion engine which is applied to a valve characteristic varying apparatus including a hydraulic valve characteristic varying mechanism and an operation-fluid controller for adjusting a condition of an operation fluid supplied to the hydraulic valve characteristic varying mechanism in order to control a valve characteristic of an engine valve, the method comprising:

obtaining a detection value corresponding to the valve characteristic of the engine valve; and learning a deviation amount of a response characteristic of the valve characteristic varying apparatus based on a temporal variation of the valve characteristic by using of the detection value as an input, in a situation that a distance between an operational signal of the operation-fluid controller and a holding point where the valve characteristic is held is less than or equal to a specified value, wherein the learning is performed while the operational signal is within a range from a minimum boundary to a maximum boundary of a response characteristic of the valve characteristic controller in a holding unresponsive range corresponding to a range from a holding point at which the valve characteristic of the engine valve is held to a point at which a variation speed of the valve characteristic relative to a variation in the operational signal is rapidly changed.

8. A method according to claim 7 wherein the learning is performed by compulsorily varying an operational signal of the operation-fluid controller without respect to a valve characteristic which is required from a driving condition of the internal combustion engine.

* * * * *